United States Patent Office 3,429,849
Patented Feb. 25, 1969

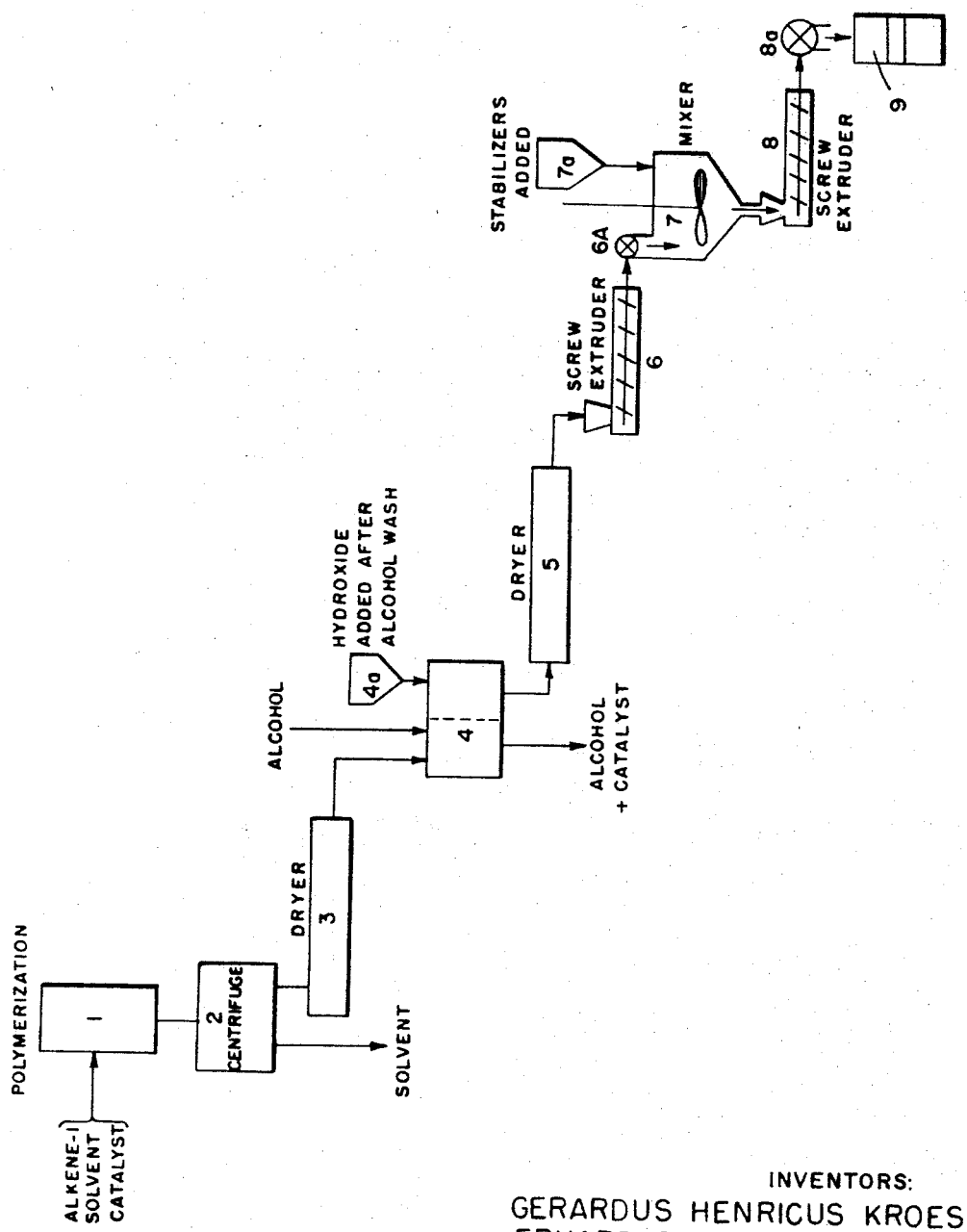

3,429,849
PROCESS FOR THERMALLY STABILIZING ISOTACTIC POLYMERS WITH (I) ALKALI METAL OR ALKALINE EARTH METAL HYDROXIDE AND (II) CONVENTIONAL THERMAL STABILIZERS
Gerardus Henricus Kroes, Arnhem, Netherlands, and Erhard Siggel, Seckmauern, Odenwald, Albert Schöpf, Hering, Odenwald, and Gerhard Meyer, Obernburg (Main), Germany, assignors to Vereinigte Glanzstoff-Fabriken AG., Wuppertal-Elberfeld, Germany
Filed Apr. 21, 1965, Ser. No. 449,694
Claims priority, application Germany, Apr. 24, 1964, V 25,882
U.S. Cl. 260—45.85    11 Claims
Int. Cl. C08f 1/88, 45/58

ABSTRACT OF THE DISCLOSURE

Process of thermally stablizing a polyolefine obtained by polymerization of an alkene-1 monomer in contact with a Ziegler catalyst wherein the initial polyolefine is produced, purified and dried under an inert atmosphere, the purified and dried polyolefine is melted and admixed with 0.001–1% by weight of an alkaline compound, such as sodium hydroxide, while still maintaining the polyolefine under an inert atmosphere, and thereafter adding at least one thermal stabilizing agent to the polyolefine. A preferred thermal stabilizing agent is a mixture of a sterically hindered phenol and a compound of the formula (alkyl-O—CO—CH$_2$—CH$_2$—)$_2$S. The stabilized polyolefine product is useful in the production of filaments, films, foils and the like.

---

The present invention is directed to an improvement in the thermal stability of high molecular weight polyolefines, and more particularly, the invention is concerned with a process in which a polyolefine obtained by the so-called "low-pressure polymerization method" is treated in a particular manner in order to substantially increase its stability against oxidation at elevated temperatures.

High molecular weight polyolefines are normally produced in the form of a purified powder or granulate which is then processed into various articles of manufacture, such as filaments, films, foils or other extruded or molded articles. In this further processing of the polyolefine in apparatus such as extruders, kneaders, injection molding machines, rollers, calenders, presses, or the like, the polyolefine is subjected to elevated temperatures which often go above 200° C. and oxygen in the air tends to cause an oxidation of the polymer during such thermal treatment. This oxidation, which is believed to result in the formation of carbonyl groups on the polymer chain, is apt to lead directly to an interruption of the chain length of the molecules and is directly responsible for various undesirable changes in the physical properties of the polymer such as a decrease in tensile strength or an increase in brittleness.

This thermal degradation has been an especially serious problem when working with those polyolefines obtained by the addition polymerization of monomeric olefines, such as the alpha-monoolefines of from 2 up to about 8 or 10 carbon atoms, as obtained by the low-pressure polymerization process requiring the use of the well-known stereospecific Ziegler catalysts. Polyolefines which are initially produced in this manner are generally referred to as isotactic polymers, and examples of such polymers include polyethylene, polypropylene, polybutylene, poly-4-methylpentene-1 and their corresponding mixtures or copolymers.

Many proposals have previously been made for using various thermal stabilizing agents, i.e., antioxidants, as additives to the polyolefine in order to retard or inhibit thermal oxidation. Such additives are generally used in amounts which do not exceed 2% by weight and in most cases less than 1% by weight is added, with reference to the polyolefine.

For example, it is known that a stabilizing effect can be achieved by the addition of small amounts of aromatic amines or various phenols or bisphenols. Aromatic amines which are useful for this purpose include such compounds as phenyl-α-naphthylamine, diphenyl-p-phenylenediamine and p-phenylenediamine and diphenylamine, and secondary aromatic amines are usually preferred. Suitable phenols and bisphenols have been described in detail in the art as antioxidants, e.g., such compounds as 1,3-bis-(p-hydroxyphenyl) - propane and 1,3-bis-(4-hydroxy-m-tolyl)-propane disclosed in U.S. 2,434,662. Sterically hindered phenols are especially preferred, i.e., a phenol or bisphenol which is substituted by at least two alkyl groups of about 1 to 12 carbon atoms, including such compounds as: 2,4,6-trialkylated phenols as disclosed in U.S. 2,625,-491; 2,2'-alkylene-bis-(4,6-dialkylphenol) or the isomeric 4,4'-alkylene-bis-(3,6-dialkylphenol) as disclosed, e.g., in U.S. 2,675,366. In the bisphenols, the two phenyl groups can be connected by an alkylene group of about 1 to 4 carbon atoms, e.g. methylene, ethylidene, isopropylidene, propylene or butylidene, although the sulfur atom can also be used as a bridge. Some bisphenols mentioned in the art are as follows: 4,4'-isopropylidene-bis-(2-methylphenol), 2,2'-methylene-bis-(4,6-dibutylphenol), 2,2'-methylene-bis(4 - methyl - 6 - tert.-butylphenol, 2,2' - isopropylidene-bis-(4,6-ditert.-dodecylphenol), 2,2'-methylene-bis-(4,6-diamylphenol), and 4,4'-isopropylidene-bis-(2,6-ditert.-butylphenol).

The stabilizing effect on a polyolefine has also been improved as disclosed in U.S. 2,519,755 by adding certain sulfur-containing esters of the formula

R—O—CO—CH$_2$—CH$_2$—S—X wherein X may represent, inter alia, the substituent —CH$_2$—CH$_2$—CO—O—R and R can be alkyl or cycloalkyl of from 4 to 18 carbon atoms. These thiodipropionates have been added as an antioxidant to polyethylene in amounts of 0.001 to 5%, preferably 0.005 to 2%, by weight with reference to the polymer. Preferred compounds of this type include dilauryl-thiodipropionate and distearyl-thiodipropionate.

It has also been established that a synergistic stabilizing effect on polyolefines can be achieved by combining a sterically hindered phenol, such as the above-mentioned phenols and bisphenols, with one of the thiodipropionates, especially dilauryl-thiodipropionate. However, the maximum stabilizing effect with this synergistic combination occurs only when using additive amounts which alter the physical properties of the polymer in an unfavorable manner. Furthermore, with increasing additive amounts of such compounds, a strong annoying odor develops during processing of the polyolefine and the sweating or blooming of these stablizing agents also increases.

It is an object of the present invention to provide a process for improving the thermal stability of high molecular weight polyolefines by means of a special treatment of the purified polymer prior to the addition of thermal stabilizing agents.

In particular, the object of the invention is to considerably improve the thermal stabilizing effect of a synergistic stabilizing combination of a sterically hindered phenol and a thiodipropionate. Still more particularly, it is an object to provide a process in which the additive amounts of such a synergistic combination can be substantially reduced so as to avoid damaging the otherwise desirable physical properties of the polyolefine while still obtaining a maximum stabilizing effect.

These and other objects and advantages of the invention will become more apparent upon consideration of the following detailed specification.

It has now been found, in accordance with the present invention, that one can achieve a substantial improvement in the thermal stabilization of polyolefines obtained by the low-pressure polymerization of an alkene-1 monomer in the presence of a Ziegler catalyst by carrying out the following steps prior to the admixture of the phenol-thiodipropionate synergistic combination as a thermal stabilizing agent. First, the polyolefine is initially produced according to the low-pressure polymerization process and is purified and dried under an inert atmosphere. Secondly, it is then necessary to homogeneously admix and disperse in a melt of the purified polyolefine about 0.001 to 1%, preferably 0.005 to 0.1%, by weight (with reference to the polyolefine) of at least one hydroxide of the elements of Groups I-A and II-A of the Periodic Table, i.e., the alkali metal and alkaline earth metal hydroxides, while still maintaining the polyolefine under an inert atmosphere. Thereafter, the synergistic combination of stabilizing agents is added to the resulting homogeneous mixture. Oxygen must be excluded from the process during initial production of the pure polyolefine and during the homogeneous admixture of the alkali metal or alkaline earth metal hydroxides thereto. These steps of the process are thus carried out under an inert atmosphere, e.g., by using an inert gas such as nitrogen.

The surprising results of this new process in retarding thermal oxidation can be readily perceived by a comparison with a simple addition of the thermal stabilizing agents while omitting the treatment with alkali metal or alkaline earth metal hydroxides. It is believed that catalyst residues remain in an active form, even though the polyolefine has been thoroughly purified, and that trace amounts of the catalyst remain to accelerate the oxidation of the polyolefine even after addition of known stabilizers. The improvement of the process according to the invention is attributed to a reaction in which the alkali metal and alkaline earth metal hydroxides react with the catalyst residues to convert them into compounds which are no longer capable of acting as an oxidation catalyst. Since the process can be applied to any purified polyolefine containing such catalyst residues, the present invention is not limited solely to the above-mentioned synergistic combination of phenols with thiodipropionates, but in a broader aspect, the invention is generally applicable to the use of any of the known thermal stabilizing agents whose stabilizing effect is considerably improved for the above-mentioned reasons when first treating the purified polyolefine with alkali metal and/or alkaline earth metal hydroxides.

In using stabilizing agents which are capable of reacting with the alkali metal or alkaline earth metal hydroxides, for example in the employment of the phenol type of stabilizing compound, it is an essential feature of the process of the invention that these stabilizers are added only after the hydroxide has been thoroughly incorporated and dispersed in the polyolefine. Furthermore it is essential that the addition and homogeneous distribution of the hydroxide prior to addition of the stabilizer be accomplished under inert conditions, i.e. non-oxidizing conditions. In other respects, it is possible to follow conventional procedures.

Thus, the process of this invention broadly resides in the step of homogeneously distributing about 0.001 to 1% by weight of the hydroxide in the purified polyolefine under inert conditions as combined with the conventional steps of initially producing, purifying and drying the polymer and subsequently adding a known antioxidant. On the other hand, it is possible to achieve an especially beneficial improvement of the stabilizing effect in carrying out the process of the invention by adding as the thermal stabilizer a synergistic combination of the sterically hindered phenols with the above-mentioned thiodipropionates as represented by the formula $$(R-O-CO-CH_2-CH_2-)_2S$$

The process of the invention is particularly applicable to the treatment of polyolefines obtained by polymerization of the alkene-1 monomers of 3 to 6 carbon atoms, these polymers having substantial commercial value only if they have been stabilized against thermal oxidation. The low-pressure reaction conditions and the Ziegler catalysts used in this polymerization, as originally disclosed by Ziegler and subsequently developed by Natta, are now well known in this art and do not require a detained explanation. In general, these catalysts are formed from transition metal salts such as trivalent or tetravalent titanium chloride and an organometallic compound such as aluminum alkyls. For example, one can use titanium trichloride with triethyl aluminum or triisobutyl aluminum as the essential catalyst components. See, for example, page 81 of "Polypropylene" by Kresser, Reinhold Publ. Corp., New York (1960).

Also, any suitable purification and drying procedure can be followed in removing the liquid polymerization medium, e.g. lower boiling hydrocarbons, and the bulk of the catalyst, provided that these steps are carried out in the absence of oxygen. It is especially preferred, however, to remove sufficient catalyst during this purification so as to yield a relatively pure product having an ignition residue or ash content of about 0.01 by weight down to about 0.005% by weight or less. It is a further advantage of the invention that satisfactory stabilization can be achieved even with a relatively large amount of catalyst residue, thereby avoiding extremely expensive and time consuming purification methods.

For convenience, it is preferable to employ readily available alkaline compounds such as sodium hydroxide, potassium hydroxide or calcium hydroxide, but other alkali metal and alkaline earth metal hydroxides or mixtures thereof are equally useful because of the small amounts of these additives. In general, the stability of the polyolefine increases with larger amounts of the hydroxide, but the polymer ordinarily should not contain more than 1% by weight of the hydroxide and optimum results can be obtained with less than 0.1% by weight of the hydroxide, e.g., with an addition of the hydroxide on the order of about 0.01% by weight.

The term "sterically hindered phenol" is employed herein to define the relatively large class of known phenols and bisphenols which have been alkylated so as to contain at least two alkyl substituents on the aromatic ring structure, at least one alkyl substituent being in ortho-position to the hydroxy group. It is particularly advantageous to employ those phenols in which one or both of the positions adjacent the hydroxy group, i.e. the ortho-positions, are occupied by a relatively large alkyl group of at least 4 carbon atoms, or in the case of bisphenols, this ortho-position can be the point at which the two benzene rings are connected by a linking divalent bridge radical such as -alkylene- or —S—. Especially good results have been achieved by using such compounds as 2,6-di-tert.-butyl-4-methylphenol,
4,4'-methylene-bis(3-methyl-6-tert.-butylphenol), and
4,4'-thio-bis-(3-methyl-6-tert.-butylphenol).

As the thiodipropionate additive employed to obtain a synergistic stabilizing effect with the sterically hindered phenol, it has been found that very desirable results are obtained by using the compounds of the formula $$(R-O-CO-CH_2-CH_2-)_2S$$

where R is a relatively long chain alkyl radical, e.g., up to 24 carbon atoms, preferably about 10 to 18 carbon atoms. Dilauryl thiodipropionate is outstanding in this respect.

The sterically hindered phenols or similar antioxidants and also the thiodipropionate can be used in conventional amounts, but the employment of the synergistic mixture of these substances and also the hydroxide pretreatment step are factors which permit a reduction in the amount of these stabilizing agents without sacrificing the desired stability. For purposes of the present invention, it is therefore quite advantageous to add about 0.001 to 0.1% by weight of the sterically hindered phenol and about 0.005 to 0.5% by weight of the thiodipropionate.

As in similar processes for working up polyolefines, the special process of this invention can naturally be carried out in any conventional manner to obtain the pure, dry polyolefine. In order to mix additives into the polymer, very different types of homogenization or mixing apparatus can be utilized and is largely a question of expediency. In addition to the uniform distribution of the alkali metal and alkaline earth metal hydroxides, it is essential to strictly observe inert conditions by excluding oxygen before and during this addition and homogeneous distribution in the polyolefine.

One of the possible and preferred continuous forms of the process according to the invention is illustrated with the aid of FIG. 1. Polypropylene is produced in known manner according to the Ziegler-Natta process in reactor 1, and is accumulated in a finely divided, powdery form. This crude product is thoroughly separated from the inert solvent used in the polymerization by means of a centrifuge or a centrifugal sifter or in another suitable separating device 2, and any adherent solvent is removed as the polymer is conducted through a dryer 3. Thereafter, the dried crude polymer is led into a vessel 4 in which the catalyst components are washed out in the usual manner, preferably with an anhydrous alcohol such as methanol or other lower alkanol. After extensive removal of the alcohol, a water-free alcoholic solution or suspension of an alkali metal or alkaline earth metal hydroxide in the above-specified amount is charged out of the feed hopper 4a into the polymer which by this time is present in pure form. It is preferable to use as the solvent or suspending agent the same alcohol as that used for catalyst extraction, particularly the lower alkanols with a boiling point as low as possible. The remaining alcohol is distilled off in dryer 5, and the polymer is thereafter melted in the extruder 6, which at the same time ensures a homogeneous dispersion of the hydroxide in the polyolefin by using a screw construction causing intense mixing under a high shearing stress. After the extruded polymer passes through the cutting device 6a, it is deposited in a mixing or blending tank 7 in which the stabilizing agents are incorporated by addition from the hopper 7a. The granulated polymer is then melted in an extruder 8 and after being chopped into granules by the cutter 8a is deposited in the shipping bag or container 9. In the course of this continuous process characterized by the numerals 1–6, complete exclusion of oxygen is necessary.

A number of tests were carried out with this continuous process, using as the Ziegler catalyst titanium trichloride and triethyl aluminum. In order to measure the stability of the stabilized polyolefine product treated according to this process, the following procedure was used. In each case, 3 grams of a sample are introduced into a test tube which stands in an aluminum block at 200±1.5° C. and which is connected to an oxygen burette. By controlling the oxygen volume, the time in minutes is determined by the spontaneous absorption of oxygen. This induction period for the oxidation of the polymer at 200° C. in pure oxygen serves as a measure of the thermal stability of the polymer.

The results of a series of tests carried out in this manner are set forth in the following tables, and the very substantial increase in thermal stability when working according to the invention will be readily apparent from these tables. The abbreviations referring to certain stabilizers have the following meaning:

DLTDP=dilauryl-thiodipropionate.
TBMBP=4,4'-thio-bis-(3-methyl-6-tert.-butylphenol).
MBMBP=4,4'-methylene-bis-(2-methyl-6-tert.-butylphenol).
DBMP=2,6-ditert.-butyl-4-methylphenol.

Percentages of the additives in these tables are by weight with reference to the polyolefine.

TABLE I.—INCREASE OF THE STABILITY OF POLYPROPYLENE BY ADDITION OF KOH

| Test No. | Percent KOH | Percent DLTDP | Percent TBMBP | Stability, minutes |
|---|---|---|---|---|
| 1 | | 0.15 | 0.03 | 26 |
| 2 | 0.003 | 0.15 | 0.03 | 55 |
| 3 | 0.005 | 0.15 | 0.03 | 70 |
| 4 | 0.01 | 0.15 | 0.03 | 96 |

TABLE II.—INCREASE OF THE STABILITY OF POLYPROPYLENE BY ADDITION OF NaOH

| Test No. | Percent NaOH | Percent DLTDP | Percent TBMBP | Stability, minutes |
|---|---|---|---|---|
| 1 | | 0.15 | 0.03 | 26 |
| 2 | 0.003 | 0.15 | 0.03 | 138 |
| 3 | 0.005 | 0.15 | 0.03 | 168 |
| 4 | 0.007 | 0.15 | 0.03 | 192 |

TABLE III.—INCREASE OF THE STABILITY OF POLYPROPYLENE BY ADDITION OF Ca(OH)$_2$

| Test No. | Percent Ca(OH)$_2$ | Percent DLTDP | Percent MBMBP | Stability, minutes |
|---|---|---|---|---|
| 1 | | 0.15 | 0.03 | 14 |
| 2 | 0.003 | 0.15 | 0.03 | 66 |
| 3 | 0.005 | 0.15 | 0.03 | 85 |
| 4 | 0.01 | 0.05 | 0.03 | 163 |

TABLE IV.—INCREASE OF THE STABILITY OF POLYPROPYLENE BY ADDITION OF NaOH WITH THE SOLE ADDITION OF TBMBP AS STABILIZER

| Test No. | Percent NaOH | Percent TBMBP | Stability, minutes |
|---|---|---|---|
| 1 | | 0.03 | 13 |
| 2 | 0.003 | 0.03 | 42 |
| 3 | 0.005 | 0.03 | 59 |
| 4 | 0.01 | 0.03 | 81 |

TABLE V.—INCREASE OF THE STABILITY OF POLY-4-METHYLPENTENE-1 BY ADDITION OF NaOH

| Test No. | Percent NaOH | Percent DLTDP | Percent TBMBP | Stability, minutes |
|---|---|---|---|---|
| 1 | | 0.15 | 0.03 | 5 |
| 2 | 0.005 | 0.15 | 0.03 | 13 |
| 3 | 0.01 | 0.15 | 0.03 | 16 |

TABLE VI.—INCREASE OF THE STABILITY OF POLY-4-METHYLPENTENE-1 BY ADDITION OF Sr(OH)$_2$

| Test No. | Percent Sr(OH)$_2$ | Percent DLTDP | Percent DBMBP | Stability, minutes |
|---|---|---|---|---|
| 1 | | 0.15 | 0.03 | 3 |
| 2 | 0.003 | 0.15 | 0.03 | 7 |
| 3 | 0.005 | 0.15 | 0.03 | 9 |
| 4 | 0.01 | 0.15 | 0.03 | 12 |

Similar results can be achieved when using dilauryl- or distearyl-thiodipropionate with other sterically hindered phenols such as 2,2'-methylene-bis-(4-methyl-6-tert.-butylphenol), 4,4' - methylene - bis - (3-methyl-6-tert.-butylphenol) or 4,4' - isopropylidene - bis - (2,6-ditert.-butylphenol).

The invention is hereby claimed as follows:
1. A process for improving the thermal stability of a high molecular weight polyolefine obtained by the low-pressure polymerization of an alkene-1 monomer in the presence of a Ziegler catalyst, said process comprising:
   initially producing, purifying and drying said polyolefine under an inert atmosphere;
   adding to the purified polyolefine and homogeneously mixing and dispersing in a melt thereof about 0.001 to 1% by weight of an alkaline compound selected from the group consisting of alkali metal and alkaline earth metal hydroxides while still maintaining said polyolefine under an inert atmosphere; and thereafter adding to the resulting homogeneous mixture at least one thermal stabilizing agent.

2. A process as claimed in claim 1 wherein said alkaline compound is admixed with said polyolefine in an amount of about 0.005 to 0.1% by weight.

3. A process as claimed in claim 1 wherein said polyolefine is obtained from an alkene-1 monomer of 3 to 6 carbon atoms.

4. A process as claimed in claim 1 wherein said polyolefine is polypropylene.

5. A process as claimed in claim 1 wherein said polyolefine is poly-4-methylpentene-1.

6. A process for improving the thermal stability of a high molecular weight polyolefine obtained by the low-pressure polymerization of an alkene-1 monomer in the presence of a Ziegler catalyst, said process comprising:

initially producing, purifying and drying said polyolefine under an inert atmosphere;

adding to the purified polyolefine and homogeneously mixing and dispersing in a melt thereof about 0.001 to 1% by weight of an alkaline compound selected from the group consisting of alkali metal and alkaline earth metal hydroxides while still maintaining said polyolefine under an inert atmosphere; and thereafter adding to the resulting homogeneous mixture a synergistic stabilizing combination of a sterically hindered phenol and a sulfur-containing compound of the formula $(R-O-CO-CH_2-CH_2)_2S$ wherein R represents alkyl of up to 24 carbon atoms.

7. A process as claimed in claim 6 wherein said polyolefine is obtained from an alkene-1 monomer of 3 to 6 carbon atoms.

8. A process as claimed in claim 7 wherein said alkaline compound is admixed with said polyolefine in an amount of about 0.005 to 0.1% by weight.

9. A process as claimed in claim 7 wherein said sterically hindered phenol is 4,4'-thio-bis-(3-methyl-6-tert.-butylphenol) and said sulfur-containing compound is dilauryl-thiodipropionate.

10. A process as claimed in claim 9 wherein said polyolefine is polypropylene.

11. A process as claimed in claim 9 wherein said polyolefine is poly-4-methylpentene-1.

References Cited

UNITED STATES PATENTS

| 3,219,622 | 11/1965 | Luciani et al. | |
| 3,112,302 | 11/1963 | Kolling et al. | 260—94.9 |
| 2,962,488 | 11/1960 | Horne | 260—94.7 |

FOREIGN PATENTS

| 222,017 | 8/1956 | Australia. |
| 890,468 | 9/1959 | Great Britain. |

DONALD E. CZAJA, *Primary Examiner.*

O. P. HOKE, *Assistant Examiner.*

U.S. Cl. X.R.

260—45.7, 45.8, 45.75, 45.9, 45.95, 94.9